(12) United States Patent
Ganesan et al.

(10) Patent No.: US 12,382,356 B2
(45) Date of Patent: Aug. 5, 2025

(54) TRANSMISSIONS BASED ON A TYPE OF COLLISION

(71) Applicant: Lenovo (Singapore) PTE. LTD., New Tech Park (SG)

(72) Inventors: Karthikeyan Ganesan, Kronberg im Taunus (DE); Prateek Basu Mallick, Dreieich (DE); Joachim Loehr, Wiesbaden (DE); Alexander Johann Maria Golitschek Edler Von Elbwart, Darmstadt (DE); Ali Ramadan Ali, Kraiburg am Inn (DE); Ravi Kuchibhotla, Chicago, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 517 days.

(21) Appl. No.: 17/765,786

(22) PCT Filed: Oct. 3, 2020

(86) PCT No.: PCT/IB2020/059300
§ 371 (c)(1),
(2) Date: Mar. 31, 2022

(87) PCT Pub. No.: WO2021/064699
PCT Pub. Date: Apr. 8, 2021

(65) Prior Publication Data
US 2022/0369187 A1    Nov. 17, 2022

Related U.S. Application Data

(60) Provisional application No. 62/909,885, filed on Oct. 3, 2019.

(51) Int. Cl.
*H04W 80/04* (2009.01)
*H04W 36/06* (2009.01)
(Continued)

(52) U.S. Cl.
CPC ....... *H04W 36/06* (2013.01); *H04W 74/0816* (2013.01); *H04W 76/14* (2018.02); *H04W 4/46* (2018.02)

(58) Field of Classification Search
CPC . H04W 36/06; H04W 74/0816; H04W 76/14; H04W 4/46
(Continued)

(56) References Cited

U.S. PATENT DOCUMENTS

2022/0295512 A1*  9/2022  Yang .................... H04W 72/56

OTHER PUBLICATIONS

CATT ("On Mode 2 Resource allocation in NR V2X", R1-1906316, May 13-17, 2019) (Year: 2019).*
(Continued)

*Primary Examiner* — Maharishi V Khirodhar
(74) *Attorney, Agent, or Firm* — Kunzler Bean & Adamson

(57) ABSTRACT

Apparatuses, methods, and systems are disclosed for transmissions based on a type of collision. One method (400) includes determining (402) that a first transmission resource corresponding to a first user equipment preempts a second transmission resource corresponding to a second user equipment as a result of a collision between the first transmission re-source and the second transmission resource in a shared resource pool. The method (400) includes transmitting (404), from the second user equipment, a request for resource reselection and activation in response to a type of collision being a periodic collision or a series collision; or transmitting, from the second user equipment, the request for resource reselection in response to the type of collision being a one-time collision.

20 Claims, 4 Drawing Sheets

(51) Int. Cl.
*H04W 36/18* (2009.01)
*H04W 74/0816* (2024.01)
*H04W 76/14* (2018.01)
*H04W 4/46* (2018.01)

(58) Field of Classification Search
USPC .......................................................... 370/331
See application file for complete search history.

(56) References Cited

OTHER PUBLICATIONS

InterDigital (R1-1909030, "NR Sidelink Resource Allocation Mechanism for Mode-2". Aug. 26-30, 2019). (Year: 2019).*
Intel (R1-1906795, "Design aspects for NR V2X Sidelink communication in resource allocation Mode-1", May 13-17, 2019). (Year: 2019).*
Ericsson, "Resource allocation for Mode-2 transmissions", 3GPP TSG-RAN WG1 #97 R1-1907136, 3rd Generation Partnership Project, May 13-17, 2019, pp. 1-18.
Interdigital et al., "NR Sidelink Resource Allocation Mechanism for Mode 2", 3GPP TSG RAN WG1 #97 R1-1907094, 3rd Generation Partnership Project, May 13-27, 2019, pp. 1-6.
Intel Corporation, "Design aspects for NR V2X sidelink communication in resource allocation Mode-1", 3GPP TSG RAN WG1 #97 R1-1906795, 3rd Generation Partnership Project, May 13-17, 2019, pp. 1-9.
NTT DOCOMO et al., "NR Sidelink Resource Allocation Mechanism Mode 1", 33GPP TSG RAN WG1 #96bis R1-1905422, 3rd Generation Partnership Project, Apr. 8-12, 2019, pp. 1-5.
Fujitsu, "Discussion on Basic Resource Allocation Methods for NR-V2X Sidelink Communication", 3GPP TSG RAN WG1 #96 R1-1901946, Feb. 25-Mar. 1, 2019, pp. 1-14.
Samsung, "On Resource Allocation Mechanisms for NR V2X", 3GPP TSG RAN WG1 Ad-Hoc Meeting 1901 R1-1901050, Jan. 21-25, 2019, pp. 1-6.
PCT/IB2020/059300, "International Search Report", PCT, Dec. 12, 2020, pp. 1-4.
PCT/IB2020/059300, "Written Opinion of the International Searching Authority", PCT, Dec. 12, 2020, pp. 1-8.

* cited by examiner

TRANSMISSIONS BASED ON A TYPE OF COLLISION

CROSS-REFERENCE TO RELATED APPLICATIONS

This application claims priority to U.S. Patent Application Ser. No. 62/909,885 entitled "APPARATUSES, METHODS, AND SYSTEMS FOR EFFICIENT LOW LATENCY V2X TRANSMISSION" and filed on Oct. 3, 2019 for Karthikeyan Ganesan, which is incorporated herein by reference in its entirety.

FIELD

The subject matter disclosed herein relates generally to wireless communications and more particularly relates to transmissions based on a type of collision.

BACKGROUND

The following abbreviations are herewith defined, at least some of which are referred to within the following description: Third Generation Partnership Project ("3GPP"), 5$^{th}$ Generation ("5G"), QoS for NR V2X Communication ("5QI/PQI"), Authentication, Authorization, and Accounting ("AAA"), Positive-Acknowledgment ("ACK"), Application Function ("AF"), Authentication and Key Agreement ("AKA"), Aggregation Level ("AL"), Access and Mobility Management Function ("AMF"), Angle of Arrival ("AoA"), Angle of Departure ("AoD"), Access Point ("AP"), Application Server ("AS"), Application Service Provider ("ASP"), Autonomous Uplink ("AUL"), Authentication Server Function ("AUSF"), Authentication Token ("AUTN"), Background Data ("BD"), Background Data Transfer ("BDT"), Beam Failure Detection ("BFD"), Beam Failure Recovery ("BFR"), Binary Phase Shift Keying ("BPSK"), Base Station ("BS"), Buffer Status Report ("BSR"), Bandwidth ("BW"), Bandwidth Part ("BWP"), Cell RNTI ("C-RNTI"), Carrier Aggregation ("CA"), Channel Access Priority Class ("CAPC"), Channel Busy Ratio ("CBR"), Contention-Based Random Access ("CBRA"), Component Carrier ("CC"), Clear Channel Assessment ("CCA"), Common Control Channel ("CCCH"), Control Channel Element ("CCE"), Cyclic Delay Diversity ("CDD"), Code Division Multiple Access ("CDMA"), Control Element ("CE"), Contention-Free Random Access ("CFRA"), Configured Grant ("CG"), Closed-Loop ("CL"), Coordinated Multipoint ("CoMP"), Channel Occupancy Time ("COT"), Cyclic Prefix ("CP"), Cyclical Redundancy Check ("CRC"), Channel State Information ("CSI"), Channel State Information-Reference Signal ("CSI-RS"), Common Search Space ("CSS"), Control Resource Set ("CORE-SET"), Discrete Fourier Transform Spread ("DFTS"), Downlink Control Information ("DCI"), Downlink Feedback Information ("DFI"), Downlink ("DL"), Demodulation Reference Signal ("DMRS"), Data Network Name ("DNN"), Data Radio Bearer ("DRB"), Discontinuous Reception ("DRX"), Dedicated Short-Range Communications ("DSRC"), Downlink Pilot Time Slot ("DwPTS"), Enhanced Clear Channel Assessment ("eCCA"), Enhanced Mobile Broadband ("eMBB"), Evolved Node B ("eNB"), Extensible Authentication Protocol ("EAP"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), Frequency Range 1—sub 6 GHz frequency bands and/or 410 MHz to 7125 MHz ("FR1"), Frequency Range 2-24.25 GHz to 52.6 GHz ("FR2"), Universal Geographical Area Description ("GAD"), Guaranteed Bit Rate ("GBR"), Group Leader ("GL"), 5G Node B or Next Generation Node B ("gNB"), Global Navigation Satellite System ("GNSS"), General Packet Radio Services ("GPRS"), Guard Period ("GP"), Global Positioning System ("GPS"), General Public Subscription Identifier ("GPSI"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Handover ("HO"), Home PLMN ("HPLMN"), Home Subscriber Server ("HSS"), Hash Expected Response ("HXRES"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Intelligent Transportation Systems Application Identifier ("ITS-AID"), Key Management Function ("KMF"), Layer 1 ("L1"), Layer 2 ("L2"), Layer 3 ("L3"), Licensed Assisted Access ("LAA"), Local Area Data Network ("LADN"), Local Area Network ("LAN"), Load Based Equipment ("LBE"), Listen-Before-Talk ("LBT"), Logical Channel ("LCH"), Logical Channel Group ("LCG"), Logical Channel Prioritization ("LCP"), Log-Likelihood Ratio ("LLR"), Long Term Evolution ("LTE"), Multiple Access ("MA"), Medium Access Control ("MAC"), Medium Access Control Control Element ("MAC CE"), Multimedia Broadcast Multicast Services ("MBMS"), Maximum Bit Rate ("MBR"), Minimum Communication Range ("MCR"), Modulation Coding Scheme ("MCS"), Master Information Block ("MIB"), Multimedia Internet Keying ("MIKEY"), Multiple Input Multiple Output ("MIMO"), Mobility Management ("MM"), Mobility Management Entity ("MME"), Mobile Network Operator ("MNO"), Mobile Originated ("MO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), New Data Indicator ("NDI"), Network Entity ("NE"), Network Exposure Function ("NEF"), Network Function ("NF"), Next Generation ("NG"), NG 5G S-TMSI ("NG-5G-S-TMSI"), Non-Orthogonal Multiple Access ("NOMA"), New Radio ("NR"), NR Unlicensed ("NR-U"), Network Repository Function ("NRF"), Network Scheduled Mode ("NS Mode") (e.g., network scheduled mode of V2X communication resource allocation—Mode-1 in NR V2X and Mode-3 in LTE V2X), Network Slice Instance ("NSI"), Network Slice Selection Assistance Information ("NSSAI"), Network Slice Selection Function ("NSSF"), Network Slice Selection Policy ("NSSP"), Operation, Administration, and Maintenance System or Operation and Maintenance Center ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), UE to UE interface ("PC5"), Policy and Charging Control ("PCC"), Primary Cell ("PCell"), Policy Control Function ("PCF"), Physical Cell Identity ("PCI"), Packet Delay Budget ("PDB"), Physical Downlink Control Channel ("PDCCH"), Packet Data Convergence Protocol ("PDCP"), Packet Data Network Gateway ("PGW"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Pre-emption Indication ("PI"), Public Land Mobile Network ("PLMN"), PC5 QoS Class Identifier ("PQI"), Physical Random Access Channel ("PRACH"), Physical Resource Block ("PRB"), Proximity Services ("ProSe"), Positioning Reference Signal ("PRS"), Physical Sidelink Control Channel ("PSCCH"), Primary Secondary Cell ("PSCell"), Physical Sidelink Feedback Control Channel ("PSFCH"), Provider Service Identifier ("PSID"), Physical Uplink Control Channel ("PUCCH"), Physical Uplink Shared Channel ("PUSCH"), QoS Class Identifier ("QCI"), Quasi Co-Located ("QCL"), Quality of Service ("QoS"), Quadrature Phase Shift Keying ("QPSK"), Registration Area ("RA"), RA RNTI ("RA-RNTI"), Radio Access Network ("RAN"), Random ("RAND"), Radio Access Technology ("RAT"), Serving RAT ("RAT-1") (serving with respect to Uu), Other RAT ("RAT-2") (non-serving with respect to Uu), Random Access Procedure ("RACH"), Random Access Preamble Identifier ("RAPID"), Random Access Response ("RAR"), Resource Block Assignment ("RBA"), Resource Element Group ("REG"), Radio Link Control ("RLC"), RLC Acknowledged Mode ("RLC-AM"), RLC Unacknowledged Mode/Transparent Mode ("RLC-UM/TM"), Radio Link Failure ("RLF"), Radio Link Monitoring ("RLM"), Radio Network Temporary Identifier ("RNTI"), Resource Pool ("RP"), Reference Signal ("RS"), Remaining Minimum System Information ("RMSI"), Radio Resource Control ("RRC"), Radio Resource Management ("RRM"), Resource Spread Multiple Access ("RSMA"), Reference Signal Received Power ("RSRP"), Received Signal Strength Indicator ("RSSI"), Road Side Unit ("RSU"), Round Trip Time ("RTT"), Receive ("RX"), Receiver User Equipment ("RX UE"), Standalone ("SA"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Secondary Cell Group ("SCG"), Shared Channel ("SCH"), Sidelink Control Information ("SCI"), Sub-carrier Spacing ("SCS"), Service Data Unit ("SDU"), Security Anchor Function ("SEAF"), Sidelink Feedback Content Information ("SFCI"), Serving Gateway ("SGW"), System Information Block ("SIB"), SystemInformationBlockType1 ("SIB1"), SystemInformationBlockType2 ("SIB2"), Subscriber Identity/Identification Module ("SIM"), Signal-to-Interference-Plus-Noise Ratio ("SINR"), Sidelink ("SL"), Service Level Agreement ("SLA"), Sidelink Synchronization Signals ("SLSS"), Session Management ("SM"), Session Management Function ("SMF"), Special Cell ("SpCell"), Single Network Slice Selection Assistance Information ("S-NSSAI"), Scheduling Request ("SR"), Signaling Radio Bearer ("SRB"), Shortened TMSI ("S-TMSI"), Shortened TTI ("sTTI"), Synchronization Signal ("SS"), Sidelink CSI RS ("S-CSI RS"), Sidelink PRS ("S-PRS"), Sidelink SSB ("S-SSB"), Synchronization Signal Block ("SSB"), Subscription Concealed Identifier ("SUCI"), Scheduling User Equipment ("SUE"), Supplementary Uplink ("SUL"), Subscriber Permanent Identifier ("SUPI"), Tracking Area ("TA"), TA Identifier ("TAI"), TA Update ("TAU"), Timing Alignment Timer ("TAT"), Transport Block ("TB"), Transport Block Size ("TBS"), Time-Division Duplex ("TDD"), Time Division Multiplex ("TDM"), Time Division Orthogonal Cover Code ("TD-OCC"), Temporary Mobile Subscriber Identity ("TMSI"), Time of Flight ("ToF"), Transmission Power Control ("TPC"), Transmission Reception Point ("TRP"), Transmission Time Interval ("TTI"), Transmit ("TX"), Transmitter User Equipment ("TX UE"), Uplink Control Information ("UCI"), Unified Data Management Function ("UDM"), Unified Data Repository ("UDR"), User Entity/Equipment (Mobile Terminal) ("UE") (e.g., a V2X UE), UE Autonomous Mode (UE autonomous selection of V2X communication resource—e.g., Mode-2 in NR V2X and Mode-4 in LTE V2X. UE autonomous selection may or may not be based on a resource sensing operation), Uplink ("UL"), UL SCH ("UL-SCH"), Universal Mobile Telecommunications System ("UMTS"), User Plane ("UP"), UP Function ("UPF"), Uplink Pilot Time Slot ("UpPTS"), Ultra-reliability and Low-latency Communications ("URLLC"), UE Route Selection Policy ("URSP"), Vehicle-to-Vehicle ("V2V"), Vehicle-to-Anything ("V2X"), V2X UE (e.g., a UE capable of vehicular communication using 3GPP protocols), Visiting AMF ("vAMF"), V2X Encryption Key ("VEK"), V2X Group Key ("VGK"), V2X MIKEY Key ("VMK"), Visiting NSSF ("vNSSF"), Visiting PLMN ("VPLMN"), V2X Traffic Key ("VTK"), Wide Area Network ("WAN"), and Worldwide Interoperability for Microwave Access ("WiMAX").

In certain wireless communications networks, collisions may occur.

BRIEF SUMMARY

Methods for transmissions based on a type of collision are disclosed. Apparatuses and systems also perform the functions of the methods. One embodiment of a method includes determining that a first transmission resource corresponding to a first user equipment preempts a second transmission resource corresponding to a second user equipment as a result of a collision between the first transmission resource and the second transmission resource in a shared resource pool. In some embodiments, the method includes transmitting, from the second user equipment, a request for resource reselection and activation in response to a type of collision being a periodic collision or a series collision; or transmitting, from the second user equipment, the request for resource reselection in response to the type of collision being a one-time collision.

One apparatus for transmissions based on a type of collision includes a processor that determines that a first transmission resource corresponding to a first user equipment preempts a second transmission resource corresponding to a second user equipment as a result of a collision between the first transmission resource and the second transmission resource in a shared resource pool. In various embodiments, the apparatus includes a transmitter that: transmits, from the second user equipment, a request for resource reselection and activation in response to a type of collision being a periodic collision or a series collision; or transmits, from the second user equipment, the request for resource reselection in response to the type of collision being a one-time collision.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
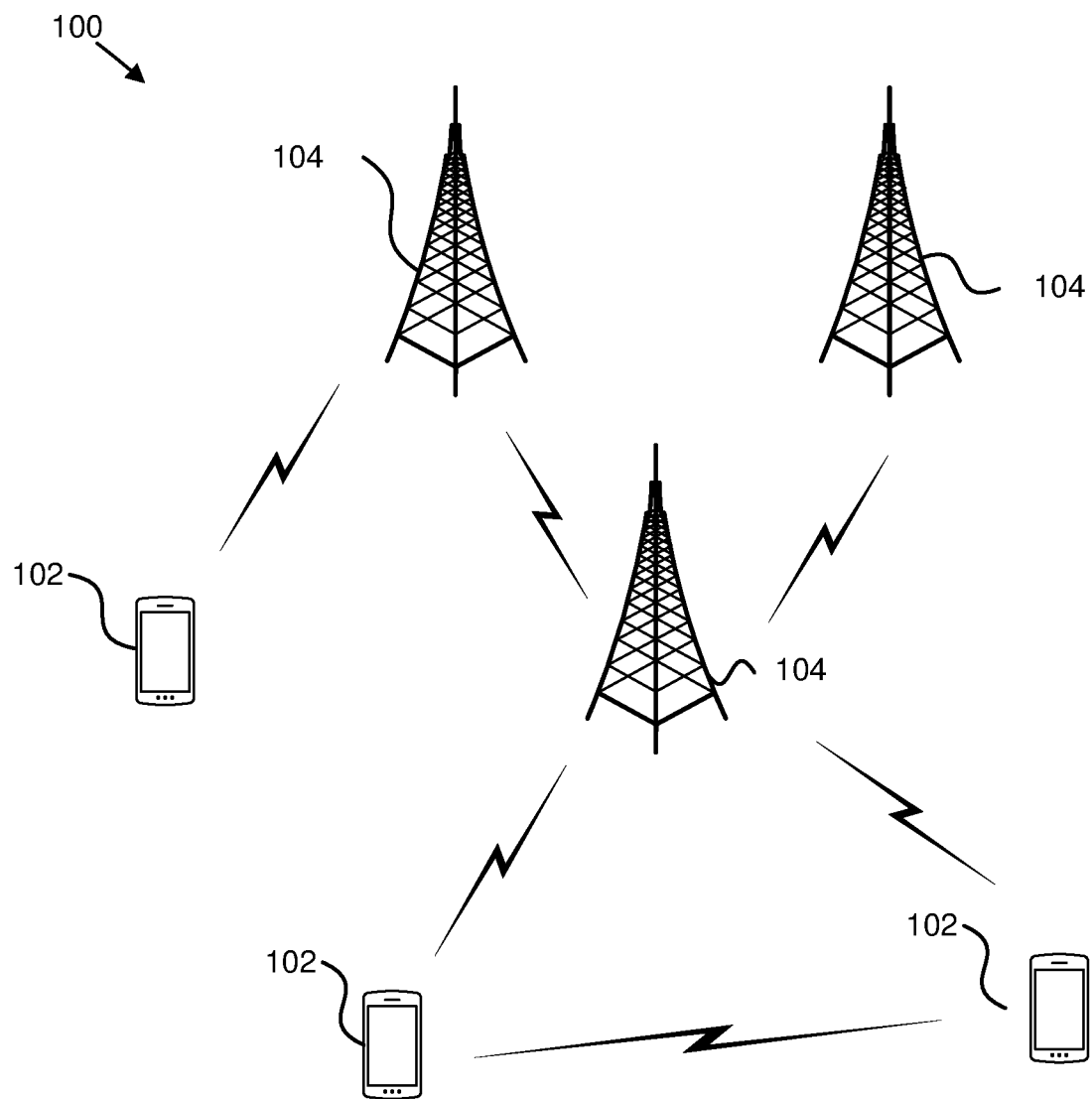
FIG. 1 is a schematic block diagram illustrating one embodiment of a wireless communication system for transmissions based on a type of collision.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmissions based on a type of collision. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, an AS, an NEF, a key management server, a KMF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 may determine that a first transmission resource corresponding to a first user equipment (e.g., remote unit 102) preempts a second transmission resource corresponding to a second user equipment (e.g., remote unit 102) as a result of a collision between the first transmission resource and the second transmission resource in a shared resource pool. In some embodiments, the remote unit 102 may transmit, from the second user equipment, a request for resource reselection and activation in response to a type of collision being a periodic collision or a series collision; or transmit, from the second user equipment, the request for resource reselection in response to the type of collision being a one-time collision. Accordingly, the remote unit 102 may be used for transmissions based on a type of collision.

Figure 2:
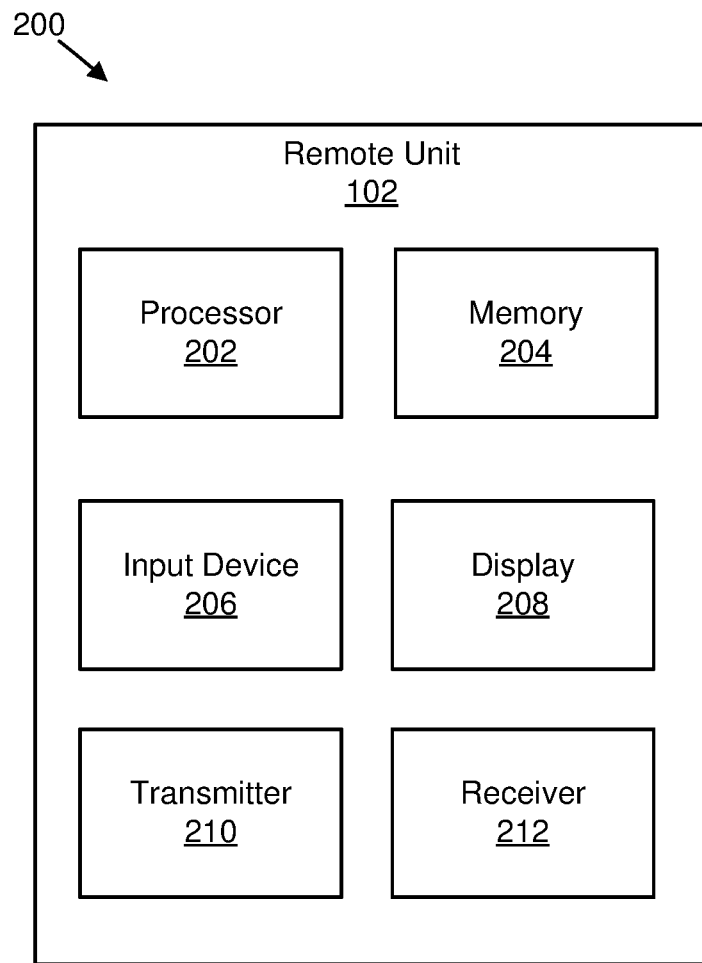
FIG. 2 is a schematic block diagram illustrating one embodiment of an apparatus that may be used for transmissions based on a type of collision.

FIG. 2 depicts one embodiment of an apparatus 200 that may be used for transmissions based on a type of collision. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The processor 202 may determine that a first transmission resource corresponding to a first user equipment preempts a second transmission resource corresponding to a second user equipment as a result of a collision between the first transmission resource and the second transmission resource in a shared resource pool. In various embodiments, the transmitter 210 may: transmit, from the second user equipment, a request for resource reselection and activation in response to a type of collision being a periodic collision or a series collision; or transmit, from the second user equipment, the request for resource reselection in response to the type of collision being a one-time collision.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
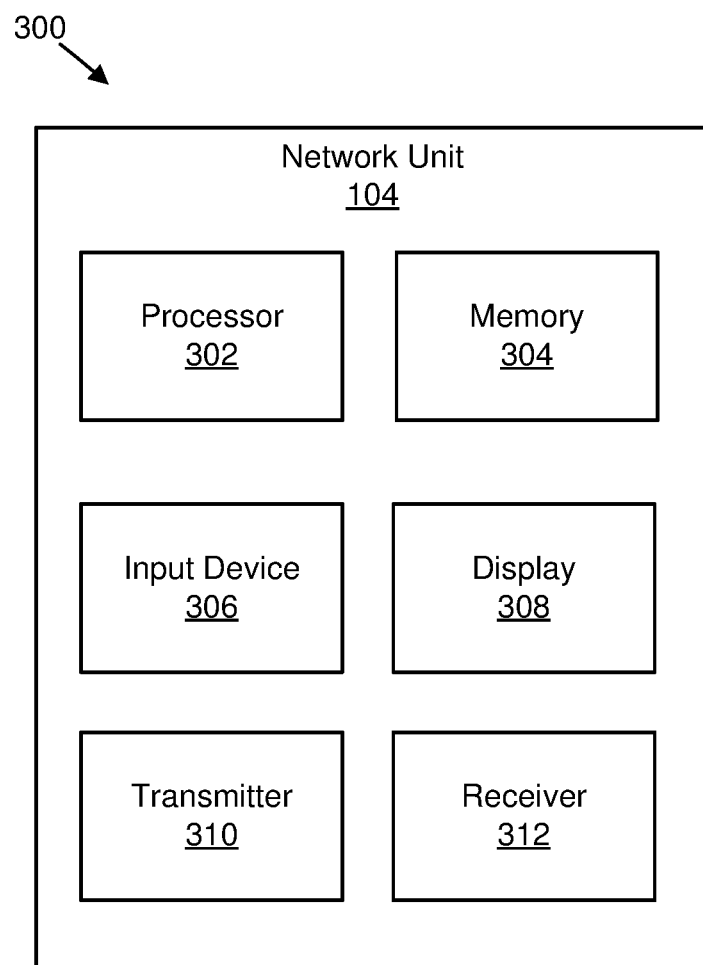
FIG. 3 is a schematic block diagram illustrating one embodiment of an apparatus that may be used for transmissions based on a type of collision.

FIG. 3 depicts one embodiment of an apparatus 300 that may be used for transmissions based on a type of collision. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively. The transmitter 310 may perform various transmission described herein and the receiver 312 may receive various messages as described herein.

In various embodiments, SL pre-emption may be used to enable high priority packet delivery by a UE in a congested situation where it may be difficult to find a candidate resource within a packet delivery budget.

In some embodiments, a UE that receives a pre-emption indication from another UE may need to do resource reselection. In such embodiments, the mechanism to do resource reselection for the pre-empted UE may need to consider a periodic or aperiodic traffic type which are allocated via a configured grant procedure and/or a dynamic grant procedure by NR mode 1 and mode 2 operations.

In certain embodiments, multicarrier and multi-panel support may be used in which a number of simultaneous SL carriers supported may depends on a number of dedicated TX and/or RX chains available for sidelink communication and/or power sharing.

In various embodiments, a number of TX and/or RF chain may be greater than a number of SL carriers. In some embodiments, carrier reselection may be performed if high priority traffic is to be transmitted and a pre-empted UE may also trigger carrier reselection. In certain embodiments, if carrier reselection is performed, a resource reserved for retransmission in a previous SL carrier may be freed up for other UEs.

In some embodiments, there may be power sharing among SL carriers during simultaneous SL transmission and, in certain embodiments, transmit power may not be enough to meet a configured QoS in a given communication range (e.g., MCR).

As used herein, mode 1 may refer to embodiments in which a BS schedules SL resources to be used by a UE for SL transmissions. Furthermore, as used herein, mode 2 may refer to embodiments in which a UE determines (e.g., BS does not schedule) SL transmission resources within SL resources configured by a BS and/or network or pre-configured SL resources.

In various embodiments, a definition of SL resource allocation mode 2 may cover: a) a UE autonomously selecting a SL resource for transmission; b) the UE assisting SL resource selection for other UEs (e.g., a functionality that may be part of a), c), or d)); c) the UE being configured with an NR configured grant (e.g., Type-1 like) for SL transmission; and/or d) the UE scheduling SL transmissions of other UEs.

In some embodiments, resource allocation mode 2 may support reservation of SL resources at least for blind retransmission. In certain embodiments, sensing and resource reselection may include sensing and/or resource reselection-related procedures supported for resource allocation mode 2. In various embodiments, a sensing procedure may be defined as decoding SCIs from other UEs and/or SL measurements. In some embodiments, decoding SCIs may provide information about SL resources indicated by a UE transmitting SCI. In certain embodiments, a sensing procedure uses a L1 SL RSRP measurement based on a SL DMRS if a corresponding SCI is decoded.

In various embodiments, a resource reselection procedure may use results of a sensing procedure to determine resources for SL transmission.

As used herein, the terms eNB and/or gNB may be used for a base station but may be replaceable by any other radio access node (e.g., BS, eNB, gNB, AP, and/or NR). Moreover, while various embodiments described herein may be described in the context of 5G NR, the embodiments described herein may be applicable to other mobile communication systems supporting serving cells and/or carriers configured for sidelink communication (e.g., over a PC5 interface).

Table 1 shows various embodiments for resource collision handling by summarizing a TX UE behavior based on a type of collision between UEs. In all of the scenarios of Table 1, a TX UE is a pre-empted UE that requires resource selection and/or reselection to find new candidate resource for transmitting a pre-empted resource.

TABLE 1

| Mode 1 and Mode 2 sharing RPs | | |
|---|---|---|
| High priority: Mode 2 | If a high priority mode 2 CG resource pre-empts a TX UE transmitting a mode 1 CG resource, then the TX UE signals to a gNB for resource selection and/or reselection & activation of another CG resource depending on the type of collision (e.g., periodic or series collision of resources). | If a high priority mode 2 dynamic resource pre-empts a TX UE having a mode 1 dynamic resource, then the TX UE signals to the gNB for resource selection and/or reselection and may depend on the type of collision (e.g., one shot collision between them). |
| Low priority: Mode 1 | Option 1: the TX-UE transmits UE assistance information to inform the gNB about the duration and/or resource (e.g., whether initial or reserved resource) of collision. Option 2: the TX-UE makes a SR and/or BSR transmission after receiving a PI. | Option 1: the TX-UE transmit SL HARQ-NACK feedback to the gNB in a PUCCH resource to inform the gNB of the need for a transmission and/or retransmission resource. Option 2: the TX UE may transmit and/or retransmit a mode 1 pre-empted resource with a mode 2 operation and may transmit ACK sent to the gNB. The ACK may be sent even before the mode 2 transmission and/or retransmission without waiting for SL ACK and/or NACK feedback from RX UEs. |
| | If a high priority mode 2 dynamic resource pre-empts the TX UE having a mode 1 CG resource, then the TX UE signals a need for resource selection and/or reselection depending on a type of collision (e.g., one shot collision between them). Option 1: the TX-UE transmit SL HARQ-NACK feedback to the gNB in a PUCCH resource to | If a high priority mode 2 CG resource pre-empts a TX UE having a mode 1 dynamic resource, then the TX UE signals to the gNB for resource selection and/or reselection depending on a type of collision (e.g., one shot collision between them). Option 1: the TX-UE transmits SL HARQ-NACK to the gNB in |

TABLE 1-continued

| | | |
|---|---|---|
| | inform the gNB of a need for a transmission and/or retransmission resource and the gNB provides a transmission grant and/or retransmission grant before a PDB. SPS resource selection and/or reselection may not be needed and a pre-empted resource may be dynamically scheduled.<br>Option 2: A mode 1 pre-empted resource may also be transmitted and/or retransmitted with a mode 2 operation before a PDB and optionally may transmit ACK sent to the gNB. The ACK may be sent before the mode 2 transmission and/or retransmission without waiting for SL ACK and/or NACK feedback from RX UEs. | a PUCCH resource to inform the gNB of a need for a transmission and/or retransmission resource.<br>Option 2: a mode 1 pre-empted resource may be transmitted and/or retransmitted with a mode 2 operation and optionally ACK sent to the gNB. The ACK may be sent before the mode 2 transmission and/or retransmission without waiting for SL ACK and/or NACK feedback from RX UEs. |
| Mode 1 and Mode 2 sharing RPs<br>High priority: Mode 1<br>Low priority: Mode 2 | If a high priority mode 1 CG resource pre-empts a TX UE having a mode 2 dynamic resource, then the TX UE performs resource selection and/or reselection and finds another candidate resource before a PDB (e.g., one shot collision between them).<br>Option 1: Priority of a pre-empted packet may be increased based on a remaining PDB budget (e.g., the shorter a remaining PDB, the higher (lower numerically) a priority assigned to the pre-empted packet). | |
| Mode 1 collision (Inter UE) | The TX UE receives and decodes a PI from another UE before or while processing or generating SCI based on a first DCI grant, (e.g., one shot collision between them)<br>Option 1: The TX UE does not generate and transmit SCI for low priority traffic and the TX UE transmits SL HARQ-NACK to the gNB in a PUCCH resource.<br>Option 2: A mode 1 pre-empted resource may be transmitted and/or retransmitted with a mode 2 operation and optionally may transmit ACK sent to gNB, This ACK can be sent even before the mode 2 transmission and/or retransmission without waiting for SL ACK and/or NACK feedback from RX UEs. | |
| Mode 2 collision (Intra-UE) | If the TX UE generates another trigger for resource selection and/or reselection with higher priority while processing the current resource selection and/or reselection trigger.<br>Option 1: The MAC selects a candidate resource for high priority traffic based on a PHY selected resource set and resource selection and/or reselection may be triggered for a lowest priority.<br>Option 2: Priority of a pre-empted packet may be increased based on a remaining PDB budget (e.g., the shorter the remaining PDB, the higher (lower numerically) the priority assigned to the pre-empted packet). | |

In various embodiments, if there is a resource collision between mode 1 and mode 2 on a shared resource pool, a TX UE behavior may depend on a type of collision between the UEs, which may be: a periodic or series collision of resources that may result in initial transmission and/or reserved transmission, and in another embodiment a one shot collision between them. In some embodiments, lower priority V2X and/or SL UEs, after receiving and decoding signaling for pre-emption indication or reservation indication which also indicates a priority of a packet transmission, may perform resource selection and/or reselection based on a type of collision and the TX UE behavior may depend on a mode of operation (e.g., mode 1 or mode 2).

In certain embodiments, if a high priority mode 2 CG resource pre-empts a TX UE transmitting a mode 1 CG resource and there is a periodic or series of resource collision between them, then the TX UE signals the gNB for resource selection and/or reselection for the low priority traffic.

In various embodiments, a TX UE may trigger to transmit UE assistance information via L3 signaling (e.g., RRC signaling) to inform a gNB about a collision of a CG resource and/or to indicate whether a collision is with initial and/or reserved resources. In some embodiments, if a resource collision occurs all or part of the CG resources, then a gNB may activate another CG resource, the gNB may deactivate a previous CG resource, and/or the gNB may activate another resource based on assistance information about the collision. In certain embodiments, a UE may implicitly deactivate a CG resource and/or inform a gNB in assistance information about a need to activate another CG resource. In various embodiments, UE assistance information is in an RRC message that may be an event triggered by a TX-UE after receiving a resource reservation and/or a pre-emption indication, and/or may be periodically transmitted by a TX-UE. In some embodiments, other L1 signaling may be used to provide information to a gNB via an uplink transmission.

In certain embodiments, a TX UE makes a SR or BSR transmission after receiving a resource reservation request or pre-emption indication and/or assistance information for resource selection and/or reselection as part of L1 and/or L2 signaling such as via a MAC CE.

In various embodiments, for certain mode 1 and mode 2 sharing resource pools there is one shot or single shot resource collision between UEs, a TX UE signals to a gNB for resource selection and/or reselection for low priority traffic.

In some embodiments, a TX UE transmit SL HARQ-NACK feedback to a gNB in an UL-PUCCH resource to inform about a need for a transmission and/or retransmission resource.

In certain embodiments, a mode-1 pre-empted resource may be transmitted with a mode 2 operation in which a T2 value is chosen based on a remaining PDB budget and optionally may transmit ACK in SL HARQ feedback sent to a gNB. The ACK may be sent before a mode 2 transmission and/or retransmission without waiting for SL ACK and/or NACK feedback for RX UEs.

In various embodiments in which a V2X UE and/or SL UE autonomously selects resources, if a high priority mode-1 grant pre-empts a low priority mode 2 V2X UE and/or SL UEs and there is a single shot or one shot resource collision between them, then resource selection and/or reselection may be triggered by a mode 2 V2X UE and a priority of a pre-empted packet may be increased based on a remaining PDB budget (e.g., the shorter the remaining PDB, the higher (lower numerically) a priority assigned to the pre-empted packet).

In some embodiments, for mode 1 resource collision (e.g., Inter UEs), a TX UE may receive and/or decode a PI from another UE before or while processing or generating SCI based on a first DCI grant. In certain embodiments, there may be one shot or single shot resource collision between UEs, then a TX UE signals to a gNB for resource selection and/or reselection for a mode-1 grant. In various embodiments, in response to their being a shared resource pool between mode1 and mode2, a mode-1 inter UE resource collision may happen in a separate resource pool allocated for mode-1 due to different V2X priority levels and low latency V2X packet transmission.

In some embodiments, a TX UE may not generate and transmit SCI for low priority traffic and the TX UE may transmit SL HARQ-NACK to a gNB in a PUCCH resource.

In certain embodiments, a mode 1 pre-empted resource may be transmitted and/or retransmitted with a mode 2 operation and optionally may transmit ACK sent to a gNB. The ACK may be sent before the mode 2 transmission and/or retransmission without waiting for SL ACK and/or NACK feedback from RX UEs.

In various embodiments, for mode 2 resource collision (e.g., Intra UEs), a sensing operation of monitoring and/or decoding SCI may happen every time slot and if the UE receives a resource selection and/or reselection trigger if there is any V2X packet for transmission, the UE may select the suitable T1 value based on its processing capability and within the T1 value the TX UE may perform resource exclusion and/or a candidate resource set selection procedure, and may report it to a MAC layer. The MAC layer may randomly choose a resource for a transmission from a set within a PDB.

In some embodiments, a TX UE may generate another trigger for resource selection and/or reselection for a higher priority V2X packet while processing a current resource selection and/or reselection trigger that is within a T1 value.

In certain embodiments, a MAC selects a candidate resource for a high priority packet transmission based on a PI-TY selected resource set and resource selection and/or reselection may be triggered for a lowest priority packet transmission with a remaining PDB budget.

In various embodiments, a priority of a pre-empted packet may be increased based on a remaining PDB budget (e.g., the shorter the remaining PDB, the higher (lower numerically) the priority assigned to the pre-empted packet).

In some embodiments, if a TX UE or gNB does not find a resource in the same SL component carrier or SL BWP, the TX UE or gNB may trigger carrier selection and/or reselection or BWP selection and/or reselection to find a resource for a pre-empted UE within a remaining PDB, where the BWP may be in the same of different SL component carrier and/or configured with same or different numerology than a previous one.

In certain embodiments: 1) not all V2X and/or SL UE packet priorities may transmit a pre-emption indication; 2) a quality in resource selection may be for reliable transmission and/or reception; and/or 3) there may be a switching criteria for a configured grant type-1.

In various embodiments, a gNB may transmit in SIBs and/or in a dedicated RRC configuration message information about a SL-LCH priority, PQI value, PDB value, latency value, and/or CBR threshold for a SL-UE preemption so that not all V2X and/or SL UE generated traffic priority may transmit a pre-emption indication.

In some embodiments, in autonomous resource selection method (e.g., NR mode-2), if a candidate resource set SA of a TX UE is based on a certain RSRP and/or RSSI threshold is less than 20% of total resource, then the TX UE may adjust the RSRP and/or RSSI threshold and may perform candidate resource selection. In certain embodiments, to ensure lower latency and reliable packet transmission and/or reception, a gNB may configure an RSRP and/or RSSI threshold or may be configured and/or preconfigured for candidate resource selection based on PQI, PDB, latency, and/or CBR value.

In various embodiments, a gNB may signal in RRC signaling, via a configuration, and/or via configuration, when to use a SL configured grant type-1 resource (e.g., grant free) for V2X transmission, and/or a corresponding resource selection method (e.g., random and/or partial sensing). A separate configured grant type-1 resources and/or resource pool may be configured for a particular destination group ID to minimize collision.

In some embodiments, if a latency and/or PDB of a V2X packet transmission is less than or equal to a T1 value (e.g., T1 is a UE physical layer processing time), then a TX UE may choose to transmit a V2X and/or SL packet via a configured grant type-1 resource pool. In such embodiments, the TX-UE may transmit a resource reservation request and/or pre-emption indication for a configured grant type-1 resource pool in advance. In certain embodiments, a TX UE may perform random resource selection and/or partial sensing (e.g., decoding based on one or a few previous slots) on a configured grant type-1 resource pool and a corresponding sensing and resource selection method that may be either random resource selection and/or partial sensing may be signaled by a gNB, configured, and/or preconfigured.

In various embodiments, a sidelink carrier selection and/or reselection and/or BWP selection and/or reselection may be performed due to one of the following: 1) a number of TX and/or RF chain<a maximum number of supported SL carriers or BWPs; 2) a TX power budget problem due to a constraint in power sharing among multiple SL carriers due to simultaneous transmissions; and/or 3) a TX power budget constraint due to an insufficient transmit power to provide to RX UEs within a MCR.

In some embodiments, a resource that is reserved for blind or HARQ transmission and/or retransmission of a TB in a current SL carrier or BWP may be freed up for other UEs before carrier selection and/or reselection. In certain embodiments, for NR mode 1, a TX UE may transmit UE assistance information to a gNB and/or transmit SL-HARQ-ACK feedback in a configured UL-PUCCH resource indicating to release a reserved resource to schedule other SL and/or V2X UEs. In various embodiments, for NR mode 2, a TX UE may indicate to release a reserved resource by setting a reservation interval field to zero in SCI by transmitting a standalone PSCCH resource or with a last data transmission (e.g., PSCCH+PSSCH) using broadcast destination ID to all surrounding UEs.

In certain embodiments, in a V2X autonomous resource selection method (e.g., NR Mode-2), steps may include a sensing operation of monitoring, decoding SCI, and/or resource exclusion. In such embodiments, candidate resource selection may happen for every individual sidelink component carrier or SL-BWP and a high layer may provide a V2X service type to SL component carrier mapping information.

In some embodiments, a higher priority V2X UE and/or SL UE may trigger resource selection and/or reselection in one or more SL component carriers and/or SL BWPs simultaneously and may start in one or more carriers or BWPs a resource exclusion and a candidate resource selection process after receiving a resource selection and/or reselection trigger (e.g., resource selection and/or reselection trigger for every BWP and/or CC). In such embodiments, a TX-UE may choose to transmit only in one given SL component carrier or SL BWP if the candidate resources are found first within the PDB.

In various embodiments, if a SL component carrier or SL BWP within the same band are close to each other, which could happen for wider bandwidth operation in mmwave frequencies, and there is not enough guard separation in frequency between carriers or SL BWPs, which may result in a half duplex issue that means if a UE is transmitting and/or receiving on a carrier or SL BWP, the same UE cannot receive and/or transmit on adjacent carriers or SL BWP in the same slot. Such embodiments may cause an issue for low latency V2X and/or SL operations in which many of the slots cannot be used to schedule urgent sidelink transmissions.

In certain embodiments, a gNB, configuration, and/or preconfiguration may configure a TX UE with RRC signaling about a SL carrier group and/or a SL BWP group from multiple supported SL carriers or SL BWPs, and the UEs may be configured with individual sensing operations for every individual SL carrier or SL BWP, but there may be joint resource exclusion and/or joint candidate resource selection on the configured SL carrier group and/or the SL BWP group.

In some embodiments, a gNB, configuration, and/or preconfiguration may configure a TX UE with RRC signaling about a SL carrier group and/or a SL BWP group from multiple supported SL carrier or SL BWPs, and a configuration message may only indicate to perform a joint candidate resource selection process among a SL carrier group or a SL BWP group. In such embodiments, in a sensing operation process, resource exclusion may happen for every individual SL carrier or SL BWP.

In various embodiments, a configuration message from a TX-UE, RSU, and/or S-UE may be transmitted via PC5 RRC signaling about an embodiment to use for RX UEs in a group for unicast and/or groupcast transmission.

In certain embodiments, a V2X UE may be equipped with multiple distributed antenna panels and/or beams and these may be directional in nature combined with a mmwave frequency. The directionality may determine a desired boresight angle (e.g., azimuth, elevation, or both), and an axis of maximum gain (e.g., maximum radiated power) for a (e.g., reference) transmission beam. In some embodiments, a range may be conditioned on an indicated directionality (e.g., indicating a minimum distance in an angular direction (e.g., direction of the boresight angle with a certain (e.g., reference) beam width for a (e.g., reference) transmission) beam that the QoS parameters need to be fulfilled). In various embodiments, based on a directionality parameter, a UE L1 and/or L2 may determine a spatial domain transmission filter to use that satisfies a desired directionality and range characteristics for a transmission. In certain embodiments, a spatial domain transmission filter may include determining one or more antenna panels, arrays, and/or sub-arrays from a set of antenna panels and/or arrays at a UE, and/or may transmit precoding antenna element weights to use. In some embodiments, precoding may be a digital precoding or a combination of digital and analog precoding (e.g., hybrid precoding).

In various embodiments, to choose a best resource for groupcast transmission for beam sweeping or multi-beam operation for NR mode 2, gNB signaling, a configuration, or a preconfiguration may provide details about an antenna panel group or beam group in which a group may be formed from multiple antenna panels, beams, arrays, and/or sub-arrays. In such embodiments, there may be one or more groups formed for a V2X UE based on a cast type and/or carrier frequency.

In certain embodiments, UEs may be configured with a sensing operation including monitoring and/or decoding SCI and/or measuring RSRP and/or RSSI from PSCCH and/or PSSCH which may be performed for individual antenna panels or beams equipped in V2X UE. In such embodiments, there may be joint resource exclusion and/or joint candidate resource selection from a configured group.

In some embodiments, a configuration message may only indicate to perform joint candidate resource selection process from a configured group and process of a sensing operation. In such embodiments, resource exclusion may happen for every individual antenna panel, beam, array, and/or sub-array.

In various embodiments, a configuration message may be used to indicate to perform joint sensing, joint resource exclusion, and/or joint candidate selection from multiple groups or from a single group.

Figure 4:
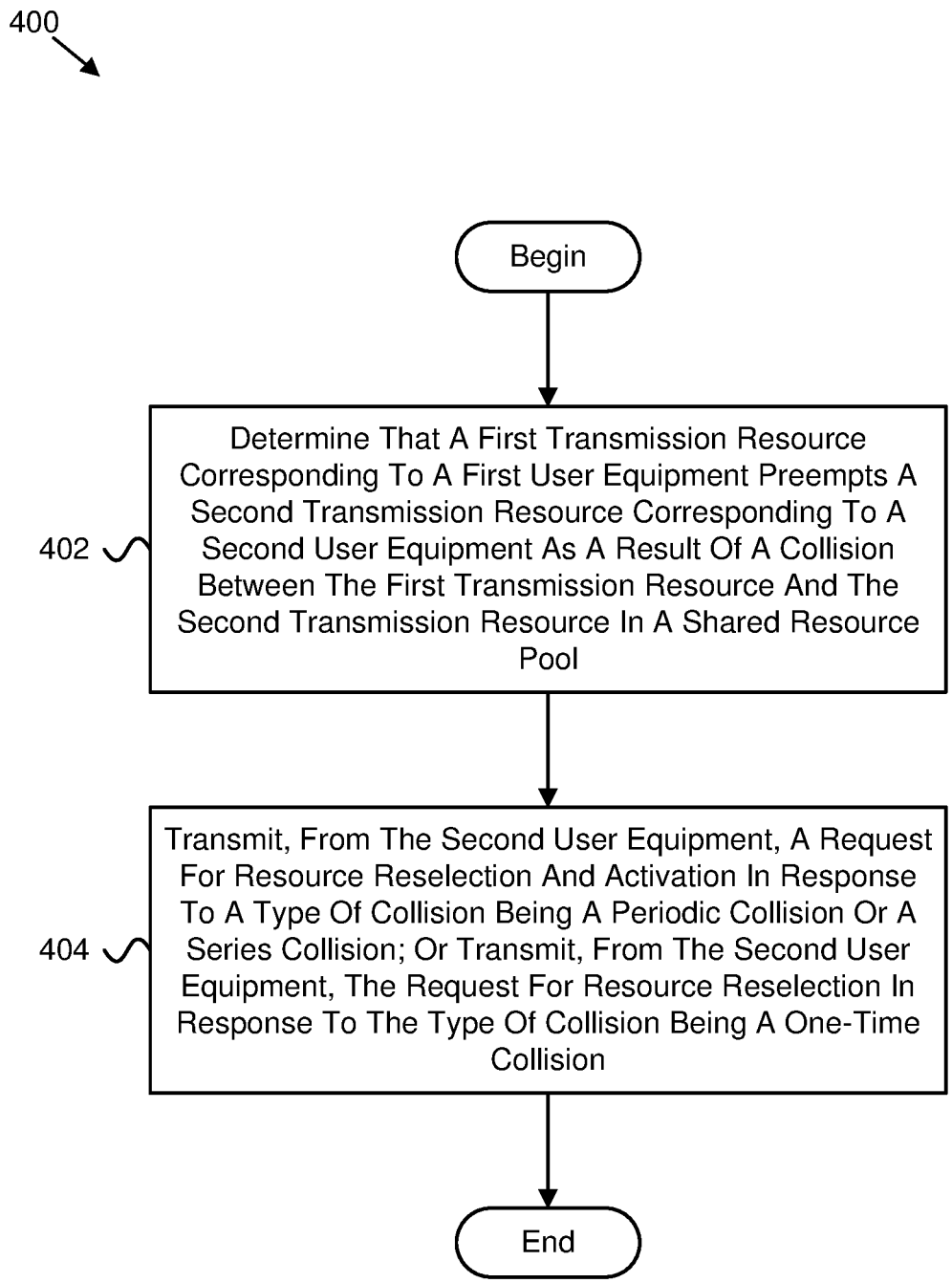
FIG. 4 is a flow chart diagram illustrating one embodiment of a method for transmissions based on a type of collision.

FIG. 4 is a flow chart diagram illustrating one embodiment of a method 400 for transmissions based on a type of collision. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

In various embodiments, the method 400 includes determining 402 that a first transmission resource corresponding to a first user equipment preempts a second transmission resource corresponding to a second user equipment as a result of a collision between the first transmission resource and the second transmission resource in a shared resource pool. In some embodiments, the method 400 includes transmitting 404, from the second user equipment, a request for resource reselection and activation in response to a type of collision being a periodic collision or a series collision; or transmitting, from the second user equipment, the request for resource reselection in response to the type of collision being a one-time collision.

In certain embodiments, the type of collision is the periodic collision. In some embodiments, the type of collision is the series collision. In various embodiments, the first transmission resource is a mode 2 configured grant resource and the second transmission resource is a mode 1 configured grant resource.

In one embodiment, the first transmission resource has a higher priority than the second transmission resource. In certain embodiments, the request for resource reselection and activation is for a configured grant resource. In some embodiments, the method 400 further comprises transmitting user equipment assistance information indicating a duration of the collision, a resource of the collision, or a combination thereof.

In various embodiments, the method 400 further comprises, in response to determining that the first transmission resource preempts the second transmission resource, transmitting a scheduling request, a buffer status report, or a combination thereof. In one embodiment, the first transmission resource is a mode 2 dynamic resource and the second transmission resource is a mode 1 dynamic resource. In certain embodiments, the first transmission resource is a mode 2 dynamic resource and the second transmission resource is a mode 1 configured grant resource.

In some embodiments, the first transmission resource is a mode 2 configured grant resource and the second transmission resource is a mode 1 dynamic resource. In various embodiments, the first transmission resource is a mode 1 configured grant resource and the second transmission resource is a mode 2 dynamic resource. In one embodiment, the first transmission resource is a mode 1 resource and the second transmission resource is a mode 1 resource.

In certain embodiments, the request comprises sidelink hybrid automatic repeat request negative feedback. In some embodiments, the sidelink hybrid automatic repeat request negative feedback is transmitted in a physical uplink control channel. In various embodiments, the method 400 further comprises retransmitting the second transmission resource with a mode 2 operation, wherein the second transmission resource as preempted was a mode 1 operation.

In one embodiment, the method 400 further comprises transmitting a positive feedback message. In certain embodiments, in response to the second user equipment operating in mode 1, the transmitted request for resource reselection is from the second user equipment to a network unit.

In one embodiment, a method comprises: determining that a first transmission resource corresponding to a first user equipment preempts a second transmission resource corresponding to a second user equipment as a result of a collision between the first transmission resource and the second transmission resource in a shared resource pool; and transmitting, from the second user equipment, a request for resource reselection and activation in response to a type of collision being a periodic collision or a series collision; or transmitting, from the second user equipment, the request for resource reselection in response to the type of collision being a one-time collision.

In certain embodiments, the type of collision is the periodic collision.

In some embodiments, the type of collision is the series collision.

In various embodiments, the first transmission resource is a mode 2 configured grant resource and the second transmission resource is a mode 1 configured grant resource.

In one embodiment, the first transmission resource has a higher priority than the second transmission resource.

In certain embodiments, the request for resource reselection and activation is for a configured grant resource.

In some embodiments, the method further comprises transmitting user equipment assistance information indicating a duration of the collision, a resource of the collision, or a combination thereof.

In various embodiments, the method further comprises, in response to determining that the first transmission resource preempts the second transmission resource, transmitting a scheduling request, a buffer status report, or a combination thereof.

In one embodiment, the first transmission resource is a mode 2 dynamic resource and the second transmission resource is a mode 1 dynamic resource.

In certain embodiments, the first transmission resource is a mode 2 dynamic resource and the second transmission resource is a mode 1 configured grant resource.

In some embodiments, the first transmission resource is a mode 2 configured grant resource and the second transmission resource is a mode 1 dynamic resource.

In various embodiments, the first transmission resource is a mode 1 configured grant resource and the second transmission resource is a mode 2 dynamic resource.

In one embodiment, the first transmission resource is a mode 1 resource and the second transmission resource is a mode 1 resource.

In certain embodiments, the request comprises sidelink hybrid automatic repeat request negative feedback.

In some embodiments, the sidelink hybrid automatic repeat request negative feedback is transmitted in a physical uplink control channel.

In various embodiments, the method further comprises retransmitting the second transmission resource with a mode 2 operation, wherein the second transmission resource as preempted was a mode 1 operation.

In one embodiment, the method further comprises transmitting a positive feedback message.

In certain embodiments, in response to the second user equipment operating in mode 1, the transmitted request for resource reselection is from the second user equipment to a network unit.

In one embodiment, an apparatus comprises: a processor that determines that a first transmission resource corresponding to a first user equipment preempts a second transmission resource corresponding to a second user equipment as a result of a collision between the first transmission resource and the second transmission resource in a shared resource pool; and a transmitter that: transmits, from the second user equipment, a request for resource reselection and activation in response to a type of collision being a periodic collision or a series collision; or transmits, from the second user equipment, the request for resource reselection in response to the type of collision being a one-time collision.

In certain embodiments, the type of collision is the periodic collision.

In some embodiments, the type of collision is the series collision.

In various embodiments, the first transmission resource is a mode 2 configured grant resource and the second transmission resource is a mode 1 configured grant resource.

In one embodiment, the first transmission resource has a higher priority than the second transmission resource.

In certain embodiments, the request for resource reselection and activation is for a configured grant resource.

In some embodiments, the transmitter transmits user equipment assistance information indicating a duration of the collision, a resource of the collision, or a combination thereof.

In various embodiments, in response to determining that the first transmission resource preempts the second transmission resource, the transmitter transmits a scheduling request, a buffer status report, or a combination thereof.

In one embodiment, the first transmission resource is a mode 2 dynamic resource and the second transmission resource is a mode 1 dynamic resource.

In certain embodiments, the first transmission resource is a mode 2 dynamic resource and the second transmission resource is a mode 1 configured grant resource.

In some embodiments, the first transmission resource is a mode 2 configured grant resource and the second transmission resource is a mode 1 dynamic resource.

In various embodiments, the first transmission resource is a mode 1 configured grant resource and the second transmission resource is a mode 2 dynamic resource.

In one embodiment, the first transmission resource is a mode 1 resource and the second transmission resource is a mode 1 resource.

In certain embodiments, the request comprises sidelink hybrid automatic repeat request negative feedback.

In some embodiments, the sidelink hybrid automatic repeat request negative feedback is transmitted in a physical uplink control channel.

In various embodiments, the transmitter retransmits the second transmission resource with a mode 2 operation, and the second transmission resource as preempted was a mode 1 operation.

In one embodiment, the transmitter transmits a positive feedback message.

In certain embodiments, in response to the second user equipment operating in mode 1, the transmitted request for resource reselection is from the second user equipment to a network unit.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   determining that a first resource preempts a second resource based on a collision between the first resource and the second resource;
   transmitting a request for resource reselection in response to a type of collision being a periodic collision, a series collision, or a one-time collision; or
   transmitting a request for resource reselection in response to a base station trigging autonomous resource reselection in response to a type of collision being a periodic collision, a series collision, or a one-time collision; and
   performing a retransmission on the second resource with a mode 2 operation, wherein the second resource as preempted was a mode 1 operation.

2. The method of claim 1, wherein the first resource is a mode 2 configured grant resource and the second resource is a mode 1 configured grant resource.

3. The method of claim 1, wherein the first resource has a higher priority than the second resource.

4. The method of claim 1, wherein the request for resource reselection is for deactivation of a first configured grant resource and is for activation of a second configured grant resource.

5. The method of claim 1, further comprising, in response to determining that the first resource preempts the second resource, transmitting a scheduling request (SR), a buffer status report (BSR), or both.

6. The method of claim 1, wherein the first resource is a mode 2 dynamic resource and the second resource is a mode 1 dynamic resource.

7. The method of claim 1, wherein the first resource is a mode 2 dynamic resource and the second resource is a mode 1 configured grant resource.

8. The method of claim 1, wherein the first resource is a mode 2 configured grant resource and the second resource is a mode 1 dynamic resource.

9. The method of claim 1, wherein the first resource is a mode 1 configured grant resource and the second resource is a mode 2 dynamic resource.

10. The method of claim 1, wherein the first resource is a mode 1 resource and the second resource is a mode 1 resource.

11. The method of claim 1, wherein the request comprises sidelink hybrid automatic repeat request (HARQ) negative acknowledgment (NACK).

12. The method of claim 11, wherein the sidelink HARQ-NACK is transmitted in a physical uplink control channel (PUCCH).

13. The method of claim 1, further comprising transmitting UE assistance information indicating a duration of the collision, a resource of the collision, or both.

14. The method of claim 1, further comprising transmitting a positive feedback message.

15. A user equipment (UE), comprising:
   at least one memory; and
   at least one processor coupled with the at least one memory and configured to cause the UE to:
   determine that a first resource preempts a second resource based on a collision between the first resource and the second resource;
   transmit a request for resource reselection in response to a type of collision being a periodic collision, a series collision, or a one-time collision; or
   transmit a request for resource reselection in response to a base station trigging autonomous resource reselection in response to a type of collision being a periodic collision, a series collision, or a one-time collision; and
   performing a retransmission on the second resource with a mode 2 operation, wherein the second resource as preempted was a mode 1 operation.

16. The UE of claim 15, wherein the first resource is a mode 2 configured grant resource and the second resource is a mode 1 configured grant resource.

17. The UE of claim 15, wherein the first resource has a higher priority than the second resource.

18. The UE of claim 15, wherein the request for resource reselection is for deactivation of a first configured grant resource and is for activation of a second configured grant resource.

19. The UE of claim 15, further comprising, in response to determining that the first resource preempts the second resource, transmitting a scheduling request (SR), a buffer status report (BSR), or both.

20. The UE of claim 15, wherein the first resource is a mode 2 dynamic resource and the second resource is a mode 1 dynamic resource.

* * * * *